July 4, 1961     D. J. BURKE     2,990,593
PROCESS FOR EXOTHERMICALLY WELDING PIPE
Filed July 17, 1959     2 Sheets-Sheet 1
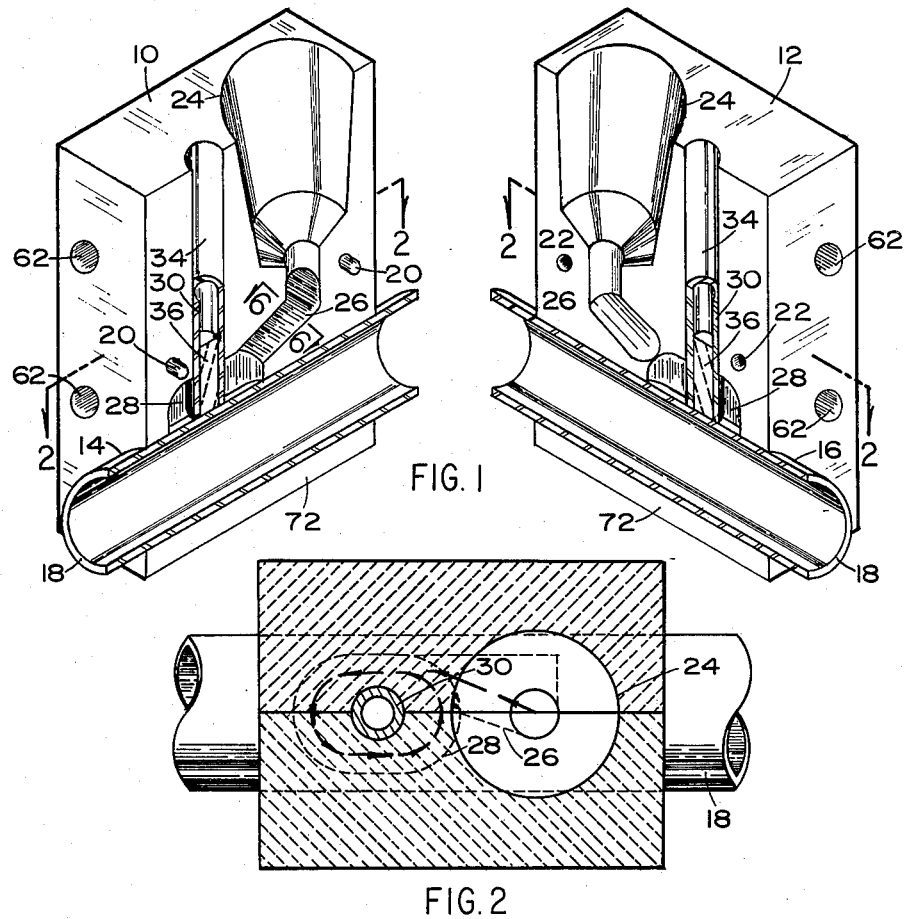
FIG. 1
FIG. 2
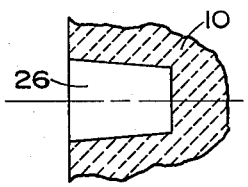
FIG. 6
*INVENTOR.*
DONALD J. BURKE
BY Paul H. Johnson July 4, 1961  D. J. BURKE  2,990,593
PROCESS FOR EXOTHERMICALLY WELDING PIPE
Filed July 17, 1959  2 Sheets-Sheet 2

INVENTOR.
DONALD J. BURKE
BY
Paul H. Johnson

United States Patent Office 2,990,593
Patented July 4, 1961

2,990,593
PROCESS FOR EXOTHERMICALLY
WELDING PIPE
Donald J. Burke, Tulsa, Okla., assignor to Continental Industries, Inc., a corporation of Oklahoma
Filed July 17, 1959, Ser. No. 827,831
4 Claims. (Cl. 22—116)

This invention refers to a method of making tee tap connections to pipe using the exothermic process and to improved molds for exothermically welding taps to pipe.

The exothermic process used for this purpose consists basically in the reaction of copper oxide with an aluminum reducing agent which produces a copper brazing alloy. A utilization of this process requires a conveyance of the molten metal to a proper physical disposition to perform the weld plus a proper transfer of heat from the molten metal to the metal to be welded. The proper transfer of heat is a particularly onerous problem in exothermic welding of pipe, especially in welding pipe of divergent sizes.

The problem is encountered in any type of welding when metals of different masses are to be joined. The surface area of both the small and large mass to be welded must be brought to approximately the same temperature to achieve a molecular bond with the welding metal. In applying heat to the joint to be welded care must be taken that the large and small mass are brought up to welding temperatures at the same time. The greatest problem is to achieve sufficient heat in the larger mass without overheating the smaller mass. If too much heat is applied to the smaller mass it will melt the smaller mass, making the weld useless.

The exothermic welding of pipe, especially a relatively small diameter and thin pipe to a relatively large diameter thick pipe, by exothermic process has presented difficult problems in the realm above mentioned in regard to achieving a sufficient transfer of heat to the larger pipe without overheating the smaller pipe. The hollow configuration of pipe with its relatively thin wall compared to circumferential area to be welded, makes it especially vulnerable to quickly overheating when molten metal suddenly comes in contact with it. The problem in welding pipe taps by the exothermic process is to apply uniform heat sufficient to weld a relatively large area without a local heat concentration which will either melt the tap or melt through the wall of the pipe.

It is therefore an object of this invention to alleviate these problems in the exothermic welding of pipe.

It is also an object of this invention to disclose a process of achieving a thorough and efficient exothermic weld of a smaller pipe to a larger pipe.

Another object of this invention is to disclose an improvement in molds which makes possible efficient welding of smaller to larger pipes.

These and other objects and a better understanding of this invention may be had by referring to the following description, taken in conjunction with the attached drawings, in which:

FIG. 1 is an isometric view showing the two halves of the single crucible mold.

FIG. 2 is a sectional view taken along the line 2—2 of FIG. 1.

FIG. 6 is a sectional view of the sprue taken along the line 6—6 in FIG. 1 and FIG. 3.

Figure 3:
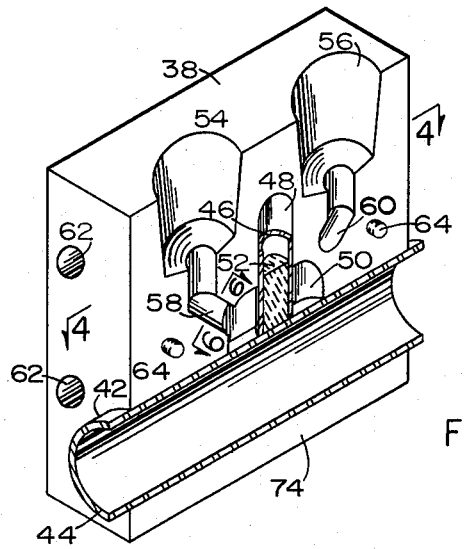
FIG. 3 is an isometric view showing the two halves of the double crucible mold.
Figure 3:
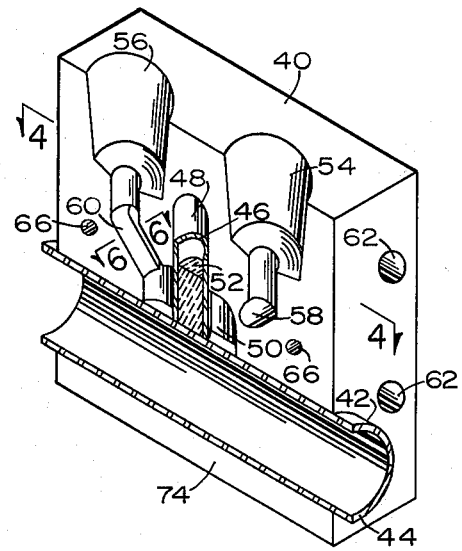

Referring now to the drawings with particular attention first to FIG. 1 and FIG. 2, the numeral 10 indicates one-half of a bifurcated single crucible mold, and the other half is indicated by numeral 12. The mold halves 10 and 12 can be made of any refractory material with graphite being preferred due to its machineable characteristic.

A half cylindrical cut 14 and 16 is made in each of the mold halves 10 and 12 of a diameter equivalent to the pipe 18 to which the welding is to be performed. Pins 20 in mold half 10 coincide with holes 22 when the mold halves 10 and 12 are placed together over the pipe 18 to perform the welding operation, thereby securing the mold halves 10 and 12 in their proper relationship to each other.

A crucible 24 is formed in each half of the mold 10 and 12 so that when placed together a cylindrical tapered shape is ascribed to the crucible 24 adapting it to receive an exothermic reaction charge which will be described later. A sprue 26 connects the crucible 24 with a weld cavity 28. The tap 30, a short piece of pipe, is positioned on the larger pipe 18 within the weld cavity 28, supported within a tap cavity 34 in the mold halves 10 and 12.

A plug 36, made of graphite or other refractory material, is placed in the bottom of the tap 30 to prevent the molten weld metal within the weld cavity 28 from solidifying within the tap 36.

Although the crucible 24 is divided equally between mold half 10 and mold half 12, the sprue 26 through which the molten weld metal flows from the crucible 24 to the weld cavity is cut primarily in mold half 10. This is best demonstrated in FIG. 2. This arrangement permits the molten weld metal to enter the weld cavity 28 at its periphery, rather than entering directly into the center of the weld cavity 28.

Figure 4:
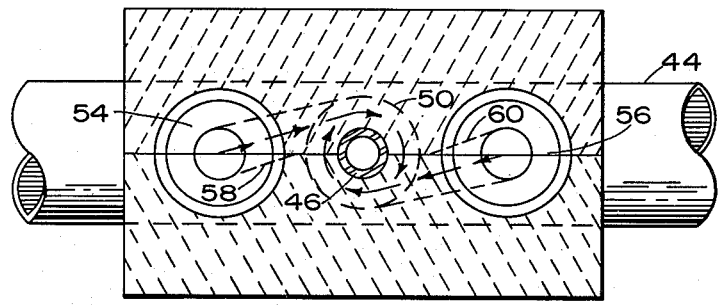
FIG. 4 is a sectional view taken along the line 4—4 of FIG. 3.

Referring now to FIG. 3 and FIG. 4 the double crucible mold is best disclosed. The construction of this embodiment of the invention is substantially the same as the single crucible mold 10 and 12, consisting of a bifurcated mold with halves 38 and 40. A cylindrical cut 42 is provided in each mold half 38 and 40 to fit about a pipe 44 to which the tap 46 is to be welded. The tap 46 is supported in a tap cavity 48. The tap 46 extends through a weld cavity 50 to contact the pipe 44. A plug 52, made of graphite or other refractory material, is placed in the lower end of the tap 46 to prevent the accumulation of molten weld metal from plugging the tap 46.

Two crucibles 54 and 56 are provided having a cylindrical tapered configuration when mold halves 38 and 40 are placed together, each adapted for receiving exothermic reaction charges. A sprue 58 discharges molten weld metal from crucible 54 into the weld cavity 50. A sprue 60 likewise discharges molten weld metal from crucible 56 into the weld cavity 50.

Sprue 58 associated with crucible 54 is cut primarily in mold half 38, while sprue 60 associated with crucible 56 is cut primarily in mold half 40. This arrangement permits sprues 58 and 60 to discharge molten weld metal into opposite points on the periphery of the weld chamber 50.

Clamp holes 62 are provided for receiving prongs of a mold clamp, not shown, used to constrain the mold halves 10 and 12, 38 and 40 together during the welding process. The tap cavities 34 and 48 may be open to the top of the mold, as shown in FIG. 1, or may be closed, as shown in FIG. 3. Pins 64 in mold half 38 coincide with holes 66 in mold half 40 to secure the mold in its proper relationship during the welding operation.

Figure 5:
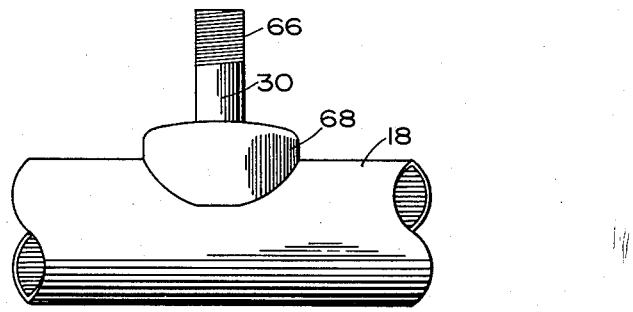
FIG. 5 is a view of a section of pipe with a nipple applied according to this invention.

The completed weld is shown in FIG. 5. The solidified weld metal 68 assumes the configuration of the weld cavities 28 and 50, bonding the pipe taps 30 and 46 to the larger pipes 18 and 44. Threads 66 on the pipe taps 30 and 46 are provided for receiving a female connection. Although pipe taps 30 and 46 having male threads 66 are shown, it is apparent that a coupling or tap having female threads would be equally adaptable.

FIG. 6, a cross section of the sprues 26, 58 and 60, shows a channel configuration of greater width than height. This causes the molten weld metal to flow into the weld cavities 28 and 50 as a flat stream rather than a more round and concentrated area. This flat form which the molten weld metal takes tends to distribute the heat onto the larger pipes 18 and 44, bringing the surface under the weld cavities 28 and 50 to welding temperatures more uniformly.

Mold halves 10 and 12 of FIG. 1 and mold halves 38 and 40 of FIG. 3 are shown with lower portions 68 and 70 surrounding pipes 18 and 44. This arrangement is useful when welding to smaller size pipe. However, when the size of the pipe to be welded becomes too large, above approximately 2 inches in practice, to avoid molds of unwieldly proportions, the lower portions 68 and 70 are eliminated, and the mold is affixed directly onto the surface of the pipe, without surrounding the pipe.

Operation

The operation of the single crucible mold of FIG. 1 will first be described. The spot on the pipe 18 where the tap 30 is to be welded is first cleaned of rust and scale, as with a coarse file. Before making the weld any moisture in the mold should first be removed. One method of drying the mold is to place mold halves 10 and 12 together and firing a preheat charge of rapidly oxidizing material in the crucible 24.

One mold half 10 is then positioned on the pipe 18. A plug 36 is placed in the end of the tap 30 and the tap 30 is positioned on the pipe 18 in tap cavity 34. The other mold half 12 is then placed in position and secured around the pipe 18 and against mold half 10.

A thin metal diaphragm is placed into the bottom of crucible 24. The crucible 24 is then filled with an exothermic reaction charge. A small amount of starting powder is placed on the charge and is ignited by a match, or flint gun, setting off the reaction. As the exothermic reaction takes place, molten weld metal melts the metal diaphragm, permitting the molten weld metal to flow through the sprue 26 and into the weld cavity 28.

The manner in which the molten weld metal enters the weld cavity 28 and functions to weld the tap 30 to the pipe 18 is an essential element of my invention. In previous exothermic welding art the practice has been to construct the mold to concentrate the molten weld metal directly upon the joint to be welded. Under this process, due to the configuration of the parts to be welded, and the great divergence in the size and heat absorbing capacities to be welded, a successful weld of divergent size pipes could not be obtained. If the molten weld metal enters the weld cavity 28 directly, heat is concentrated on the tap 30 and a small area of the pipe 18. This results in possibly melting a hole in the pipe 18 or melting off the end of the tap 30 on the front side with a failure to weld the back side.

In this process the sprue 26 enters the weld cavity 28 at its periphery. This causes the molten weld metal to flow in a circuitous path around the tap 30, thoroughly heating pipe 18, without overheating tap 30. It can be seen that the centrifugal effect of the molten weld metal flowing around the weld cavity 28 causes a whirlpool action, forcing most of the molten weld metal while in its hottest and lowest viscosity state, toward the sides of the mold cavity 28 and away from the tap 30. Heat from the molten weld metal is concentrated on the larger mass, the pipe 18, assuring a penetrating weld. As the molten weld metal cools, the centrifugal action decreases, and the pool of molten weld metal conforms to the shape of the weld cavity 28, pressing against the sides of the tap 30 whose smaller mass requires much less heat for effective welding.

The tap 30, to be inexpensively made, necessarily has a flat end contacting the curved surface of pipe 18. Even if the end of tap 30 was machined to closely conform to the curved surface of pipe 18, preventing molten weld metal from entering the tap 30 would be difficult. A plug 36, of some refractory material, such as graphite, which will not be melted by the heat of the exothermic reaction, is placed into the bottom of the tap 30. This prevents molten weld metal from welding the tap 30 solidly closed.

After the exothermic reaction has completed, taking approximately 10 seconds from the time of firing, mold halves 10 and 12 are removed, leaving the tap 10 welded to the pipe 18 by solidified weld metal 64 as shown in FIG. 5. The process is completed by placing a drill in the tap 30, drilling through the plug 36 and the pipe 18. Drilling the refractory plug 36 is relatively easy whereas if the tap 30 is permitted to fill with molten weld metal, drilling through the solidfied metal into the pipe 18 would be difficult. The plug 36 may be round, square or any other shape as long as it fills a substantial portion of the tap 30 interior. The plug 36 must fit within the tap 30 with sufficient resistance that it is not floated by the weight of the molten weld metal.

The operation of the double crucible mold of FIG. 3 is similar to that of the single crucible mold except that exothermic charges are placed in both crucibles 54 and 56. Starting powder is placed on top of both exothermic charges, with a small amount placed on top the mold between the crucibles 54 and 56. Both charges are ignited simultaneously by lighting the starting powder at a point between the crucibles 54 and 56.

The molten weld metal flows through sprues 58 and 60, entering weld cavity 50 at opposite peripheries. As indicated by arrows in FIG. 4 this establishes a whirlpool effect in the molten weld metal, similar to but more pronounced than the action described for the single crucible mold of FIG. 1. The circuitous flow of the molten weld metal sprue 58 is augmented by sprue 60, causing the molten weld metal to flow round and round within the weld cavity 50, thoroughly heating the relatively large mass of the pipe 44, and at the same time reducing the heat concentration on the relatively small mass of tap 46, tending to bring both masses up to welding temperatures simultaneously, assuring a more dependable and consistent weld.

In order to more fully concentrate the heat of the molten weld metal on a wider area of pipe 70, sprues 58 and 60 are provided whose cross sectional area, as shown in FIG. 6, is relatively wide compared with the height. This causes the molten weld metal to flow into the weld cavity 50 as a flat stream, spreading immediately over the entire area of the pipe 44 within the weld cavity 50 and more quickly bring the pipe 44 up to weld temperatures.

Although molds having only one or two crucibles are shown it is evident that the principals of this invention may apply to molds having any number of crucibles.

The thermit composition making up the exothermic reaction charge may be of types previously used in exothermic welding, as disclosed by Burke Patent 2,870,499. The following composition has also been used with satisfactory results:

| | Percent |
|---|---|
| Copper mill scale | 73 |
| 40% copper, 60% aluminum alloy | 15 |
| Ferro chrome | 1 |
| Nickel powder | 9 |
| Fluorspar | 2 |

Although this invention has been described with a certain degree of particularity it is manifest that many changes may be made without departing from the spirit and scope of this disclosure.

I claim:
1. A mold adaptable to utilize exothermically created molten weld meld for welding a tap to a pipe, comprising; a refractory body adaptable to contact and in part conform to said pipe, said refractory body having at least two crucible cavities formed therein, said crucible cavities adaptable for receiving thermit charges, a weld cavity formed therein, said weld cavity defined in part by said pipe as said mold is positioned on said pipe, a tap cavity adaptable for receiving said tap and supporting said tap in position for welding whereby a portion of said tap extends within said weld cavity so that one end of said tap is contiguous to said pipe, and a sprue cavity connecting each of said crucible cavities with said weld cavity, said sprue cavities intersecting said weld cavity substantially tangentially thereto whereby exothermically created molten weld metal flowing through said sprue cavities into said weld cavity is caused to enter said weld cavity tangentially and flow in a circuitous path around said tap, and whereby said circuitous flow of molten weld metal in said weld cavity concentrates heat of said molten weld metal on said pipe and away from said tap.

2. A mold adaptable to utilize exothermically created molten weld metal for welding a tap to a pipe, comprising; a refractory body adaptable to contact and in part conform to said pipe, said refractory body having at least two crucible cavities formed therein, said crucible cavities adaptable for receiving thermit charges, a weld cavity formed therein, said weld cavity defined in part by said pipe as said mold is positioned on said pipe, a tap cavity adaptable for receiving said tap and supporting said tap in position for welding whereby a portion of said tap extends within said weld cavity so that one end of said tap is contiguous to said pipe, and a sprue cavity connecting each of said crucible cavities with said weld cavity, said sprue cavities intersecting said weld cavity whereby one side of each of said sprue cavities is tangential to the periphery of said weld cavity whereby exothermically created molten weld metal flowing through said sprue cavities into said weld cavity is caused to enter said weld cavity tangentially and flow in a circuitous path around said tap and whereby said circuitous flow of molten weld metal in said weld cavity concentrates heat of said molten weld metal on said pipe and away from said tap.

3. A method for exothermically welding a tap to a pipe utilizing a mold having a weld cavity and a tap cavity intersecting said weld cavity, comprising the steps of placing said tap onto said pipe whereby one end of said tap is contiguous to said pipe; positioning said mold onto said pipe encompassing said tap whereby said tap is supported in said tap cavity; and introducing exothermically created molten weld metal tangentially into said weld cavity at a multiplicity of points about said weld cavity whereby said weld metal flows circuitously around said tap to cause the heat of said molten weld metal to be conducted primarily to said pipe and away from said tap, welding said tap to said pipe.

4. A method for exothermically welding a tap to a pipe utilizing a mold having a weld cavity and a tap cavity intersecting said weld cavity, comprising the steps of placing a drillable plug in one end of said tap; placing said tap onto said pipe whereby said end of said tap containing said plug is contiguous to said pipe; positioning said mold onto said pipe encompassing said tap whereby a portion of said tap is supported in said tap cavity and a portion of said tap extends within said weld cavity; and introducing exothermically created molten weld metal tangentially into said weld cavity at a multiplicity of points about said weld cavity whereby said weld metal flows circuitously around said tap to cause the heat of said molten weld metal to be conducted primarily to said pipe and away from said tap, welding said tap to said pipe.

References Cited in the file of this patent
UNITED STATES PATENTS

| | | |
|---|---|---|
| 425,071 | Greene | Apr. 8, 1890 |
| 604,490 | Ellis | May 24, 1898 |
| 681,195 | Clark | Aug. 27, 1901 |
| 1,732,515 | Hunter | Oct. 22, 1929 |
| 1,941,199 | Brotz | Dec. 26, 1933 |
| 2,119,056 | Peterson | May 31, 1938 |
| 2,318,604 | Febrey | May 11, 1943 |
| 2,672,666 | Enfer | Mar. 23, 1954 |
| 2,870,498 | Rejdok | Jan. 27, 1959 |